(12) United States Patent
Kawaguchi et al.

(10) Patent No.: US 6,590,168 B2
(45) Date of Patent: Jul. 8, 2003

(54) VEHICLE LOAD MEASURING APPARATUS

(75) Inventors: Kenichi Kawaguchi, Shizuoka (JP); Masayuki Terada, Shizuoka (JP); Kouhei Hasimoto, Shizuoka (JP); Yoji Nakazaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 103 days.

(21) Appl. No.: 09/778,868

(22) Filed: Feb. 8, 2001

(65) Prior Publication Data

US 2001/0013432 A1 Aug. 16, 2001

(30) Foreign Application Priority Data

Feb. 13, 2000 (JP) ........................................ 2000-077247
Apr. 14, 2000 (JP) ........................................ 2000-113476

(51) Int. Cl.[7] .......................... G01G 19/08; G06G 19/12
(52) U.S. Cl. ........................................ 177/136; 177/137
(58) Field of Search ................................ 177/136, 137, 177/138, 139

(56) References Cited

U.S. PATENT DOCUMENTS

| 3,889,767 A | * | 6/1975 | Scott et al. | .................. 177/136 |
|---|---|---|---|---|
| 4,215,754 A | * | 8/1980 | Hagedorn et al. | ........... 177/137 |
| 5,811,738 A | * | 9/1998 | Boyovich et al. | ............ 177/136 |
| 5,861,581 A | * | 1/1999 | Evans et al. | .................. 177/136 |
| 5,880,409 A | * | 3/1999 | Hartman | ...................... 177/137 |

FOREIGN PATENT DOCUMENTS

JP          6-16826       3/1994    .......... G01G/19/12

OTHER PUBLICATIONS

A Partial English language translation of 6–16826, Mar. 4, 1994.

* cited by examiner

*Primary Examiner*—Randy Gibson
(74) *Attorney, Agent, or Firm*—Sughrue Mion, PLLC

(57) ABSTRACT

An amount of distortion of an axle (2) caused by a load that is applied on a vehicle and transmitted to the axle (2) through a transmission member (3) is measured and then a value of the load based on the measured amount of the distortion is measured. A load concentration unit (5) is provided between the transmission member (3) and the axle (2) and receives the load concentrically.

20 Claims, 8 Drawing Sheets

VEHICLE LOAD MEASURING APPARATUS

BACKGROUND OF THE INVENTION

1. Field of the Invention

The present invention relates to a load measuring apparatus for vehicles. More particularly, the present invention relates to a vehicle load measuring apparatus which measures an amount of a load based on the distortion of an axle caused by the load that is applied to the vehicle and transmitted to the axle through a transmission member.

The present application is based on Japanese Patent Application Nos. 2000-077247 and 2000-113476, which are incorporated herein by reference.

2. Description of the Related Art

Conventionally, a load of a vehicle has been measured mainly as for a large-sized vehicle such as trucks. When an excessive amount of goods is loaded on a truck etc., the driving operability of the vehicle is degraded, which may not only cause a traffic accident but also damage the vehicle or the surface of the road. The load measurement of a vehicle is performed in order to prevent such phenomena. Usually, the load measurement of a vehicle is performed by a load measuring apparatus disposed on the road in the following manner. That is, a wheel of the vehicle is placed on a loading plate having a load converter to thereby measure a wheel load or an axle load of the wheel. The wheel loads etc. of all the wheels of the vehicle are summed to obtain a vehicle weight. The weight of all the passengers and the weight of the vehicle itself are subtracted from the vehicle weight thus measured to obtain the weight of the load mounted on the vehicle.

However, since the aforesaid load measuring apparatus is large in its size and the mounting cost thereof is high, the location where the apparatus is disposed and the number of the apparatuses to be disposed are quite limited. Thus, the number of vehicles subjected to the measurement of loads mounted thereon is only a part of the entire vehicles, so that it is insufficient to prevent the excessive loading of the vehicles. Therefore, there has been proposed a load measuring apparatus for measuring a load at every vehicle wherein a load applied to the load-carrying platform of a vehicle is transmitted to the axle, and an amount of distortion of the axle caused by the load is measured to thereby measure the load of the vehicle.

FIG. 11 is an exploded perspective view of a conventional assembled portion for a vehicle including a load-carrying frame 1, an axle 2, a leaf spring (corresponding to a transmission member) 3 etc. Two supporting portions 1a are provided at the side wall of the load-carrying frame 1 so that the supporting portions 1a support the both ends of the leaf spring 3, respectively. The center portion of the leaf spring 3 is fixed to an axle casing 2a provided at the axle 2 by attachment members 6. A sensing element 7 for measuring a distortion amount of the axle 2 is fixed on the upper surface of the axle 2. The conventional load measuring apparatus is arranged to measure a distortion amount due to a load applied to the sensing element 7 to thereby measure the load at every vehicle.

However, according to the aforesaid conventional load measuring apparatus, the center of the load transmitted to the axle casing 2a through the leaf spring 3 from the load-carrying frame 1 moves due to the distortion of the load-carrying frame 1 and the friction etc. between the axle and the leaf spring 3 caused by the loading and unloading of goods and the running state etc. of a vehicle. As a result, since the bending moment of the axle 2 changes, there arises a problem that the relation between an amount of the load of the vehicle and a mount of the distortion of the axle 2 is broken and so a value of the load to be measured becomes erroneous.

In this respect, FIGS. 12A and 12B are diagrams for explaining the center of a load when the load is small and large, respectively. FIG. 13 is a diagram showing the conventional relation between an amount of a load and a distortion error of an axle. In FIG. 13, an ordinate represents a distortion error (%) of an axle and an abscissa represents an amount (ton) of a load mounted on a vehicle.

As shown in FIG. 12A, when a load applied to the load-carrying frame 1 is small, since stress generated at a tire in accordance with the load transmitted from the ground is small, the center of a load vector v transmitted to the axle casing 2a from the leaf spring 3 locates almost at the center of the axle casing 2a. In contrast, as shown in FIG. 12B, when a load applied to the load-carrying frame 1 is large, since stress generated at a tire in accordance with the load transmitted from the ground is large, flexible distortion is generated at the load-carrying frame 1, the axle 2 etc. Thus, the center of a load vector v transmitted to the axle casing 2a from the leaf spring 3 deviates from the center of the axle casing 2a.

Therefore, as shown in FIG. 13, in accordance with the change of an amount of a load on a load-carrying platform due to a loading process A and an unloading process B, the center position of a load transmitted to the axle casing 2a from the leaf spring 3 changes, so that the relation between an amount of the load of the vehicle and an mount of the distortion of the axle 2 becomes broken. That is, there arises a hysteresis error that amounts of distortion of the axle differ between the loading process A and the unloading process B and hence the measured value of a load becomes erroneous. In this manner, the measuring accuracy of the load measuring apparatus for vehicles is degraded.

SUMMARY OF THE INVENTION

In view of the aforesaid problems of the conventional technique, an object of the present invention is to provide a load measuring apparatus for vehicles which can improve measuring accuracy of a load.

In order to attain the aforesaid object, according to a first aspect of the present invention, there is provided a vehicle load measuring apparatus, which measures an amount of distortion of an axle caused by a load that is applied on a vehicle and transmitted to the axle through a transmission member, and which measures a value of the load based on the measured amount of the distortion, the load measuring apparatus comprises a load concentration unit, which is disposed between the transmission member and the axle, and receives the load concentrically. Accordingly, since the load transmitted to the axle through the transmission member is concentrically received by the load concentration unit, even if there occurs the distortion of the load-carrying frame and the friction etc. between the axle and the transmission member caused by the loading and unloading of goods and the running state etc. of the vehicle, the moving range of the center of the load transmitted to the axle can be made small. Accordingly, the hysteresis error caused in accordance with the relation between amounts of a load mounted on the vehicle and amounts of the distortion of the axle can be reduced, so that the measurement accuracy of loads measured based on the distortion amounts of the axle can be improved.

According to a second aspect of the present invention, it is preferable that a contact surface of the load concentration unit, which contacts with the axle, has a shape that restricts movement of the load transmitted to the axle. According to the load measuring apparatus as in the second aspect of the present invention, the load applied to the vehicle is transmitted to the transmission member and the load thus transmitted is transmitted to the axle in a manner that movement of center of the load is restricted by the load concentration unit. Thus, since the axle receives a load from the edge of the load concentration unit, the moving range of the center of the load transmitted to the axle can be restricted within the contact surface of the load concentration unit to the axle. For example, the moving range of the center of a load of a vehicle with a large moving range can be made small by employing the load concentration unit having the contact surface area smaller than the moving range of the center of a load of this vehicle. Accordingly, the hysteresis error caused in accordance with the relation between amounts of a load mounted on the vehicle and amounts of the distortion of the axle can be reduced, so that the measurement accuracy of loads measured based on the distortion amounts of the axle can be improved.

According to a third aspect of the present invention, it is preferable that, in the load measuring apparatus as in the first or second aspect, an area of a contact surface of the load concentration unit, which contacts with the axle, is set to a value to deviate from plastic deformation range of the load concentration unit and to be minimized. According to the load measuring apparatus as in the third aspect of the present invention, the axle is provided with the load concentration unit which is arranged so that the contacting area thereof to the axle is set to deviate from the plastic deformation range of the load concentration unit and be small. The load concentrically received by the load concentration unit is transmitted to the axle. Thus, the smaller the contacting area between the load concentration unit and the axle is, the smaller the hysteresis error caused in accordance with the relation between amounts of a load mounted on the vehicle and amounts of the distortion of the axle becomes. However, when the load concentration unit is made too small, the load concentration unit is deformed by a load applied thereto. Therefore, the load concentration unit can be minimized by setting the contacting area between the load concentration unit and the axle so as to deviate from the plastic deformation range of the load concentration unit and be small. Accordingly, since the load can be transmitted to the axle more concentrically by the load concentration unit, the hysteresis error caused in accordance with the relation between amounts of a load mounted on the vehicle and amounts of the distortion of the axle can be reduced, so that the measurement accuracy of loads measured based on the distortion amounts of the axle can be improved.

According to a fourth aspect of the present invention, it is preferable that, in the load measuring apparatus as in the first, second or third aspect, the load concentration unit has a shape that prevents the transmission member from directly contacting with the axle at a time of mounting a load of maximum loading capacity of the vehicle. According to the load measuring apparatus as in the fourth aspect of the present invention, the axle is provided with the load concentration unit which is formed to have the shape that prevents the transmission member from directly contacting with the axle at a time of mounting the load of maximum loading capacity of the vehicle. Further, only the load concentrically received by the load concentration unit is transmitted to the axle. The load concentration unit suitable for the vehicle can be formed by determining, for example, both the areas of the contact surfaces thereof to the axle and the transmission member and the distance between both contact surfaces of the load concentration unit, that is, the thickness of the load concentration unit, by taking the distortion of the transmission member at the time of mounting a load of the maximum loading capacity into consideration. Thus, the load concentration unit having the shape accorded to the kind and type of the vehicle is provided between the transmission member and the axle to thereby prevent the transmission member from directly contacting to the axle even at the time of mounting a load of the maximum loading capacity of the vehicle, so that the accurate load can be transmitted to the axle through the load concentration unit. Accordingly, when the load concentration unit is formed so as to accord to the kind and type of the vehicle having a different maximum loading capacity, the load measuring apparatus for vehicles capable of measuring a load with a high accuracy can be provided easily at every type of vehicle.

According to a fifth aspect of the present invention, it is preferable that, in the load measuring apparatus as in the first, second, third or fourth aspect, the load concentration unit is formed separately from the axle. According to the load measuring apparatus as in the fifth aspect of the present invention, the load concentration unit formed separately from the axle is attached to the axle and a load concentrically received by the load concentration unit is transmitted to the axle. Thus, since it is possible to form the load concentration unit separately from the axle, the load concentration unit can be formed by material different from that of the axle. For example, it is possible to employ material with a small plastic deformation range for the load concentration unit. Further, the load concentration unit may be realized by a known member such as a height adjusting member used for a different object. In this manner, since the load concentration unit can be formed with the general-purpose properties, the load concentration unit can be formed easily in accordance with various types of vehicles. Accordingly, the load measuring apparatus for vehicles capable of measuring a load with a high accuracy can be provided easily at every type of vehicle.

According to a sixth aspect of the present invention, it is preferable that the load measuring apparatus as in the first, second, third, fourth or fifth aspect further comprises a distortion sensor disposed on the axle, wherein the load concentration unit is provided at a position where hysteresis error of an amount of distortion of the axle detected by the distortion sensor is reduced. According to the load measuring apparatus as in the sixth aspect of the present invention, the load concentration unit is provided at the position where hysteresis error of an amount of distortion of the axle detected by the distortion sensor provided at the axle is reduced. Only a load concentrically received by the load concentration unit is transmitted to the axle. In this manner, in order to reduce the hysteresis amount detected by the distortion sensor of the axle, for example, the optimum position of the load concentration unit is investigated through experimentation or simulation and the load concentration unit is provided at the position determined in accordance with the result of the experimentation or simulation. Thus, since twisting phenomenon etc. is prevented from occurring at the axle, the distortion sensor can accurately measure a distortion amount according to a load transmitted to the axle through the load concentration unit. Accordingly, when the load concentration unit is provided at the optimum position accorded to the kind and type of the vehicle, the load measuring apparatus for vehicles capable of measuring a load with a high accuracy can be provided easily.

DETAILED DESCRIPTION OF THE PREFERRED EMBODIMENT

An embodiment showing a case where a load measuring apparatus for vehicles according to the present invention is used for a vehicle having a load-carrying platform such as trucks will be explained with reference to FIGS. 1 to 10.

Figure 1:
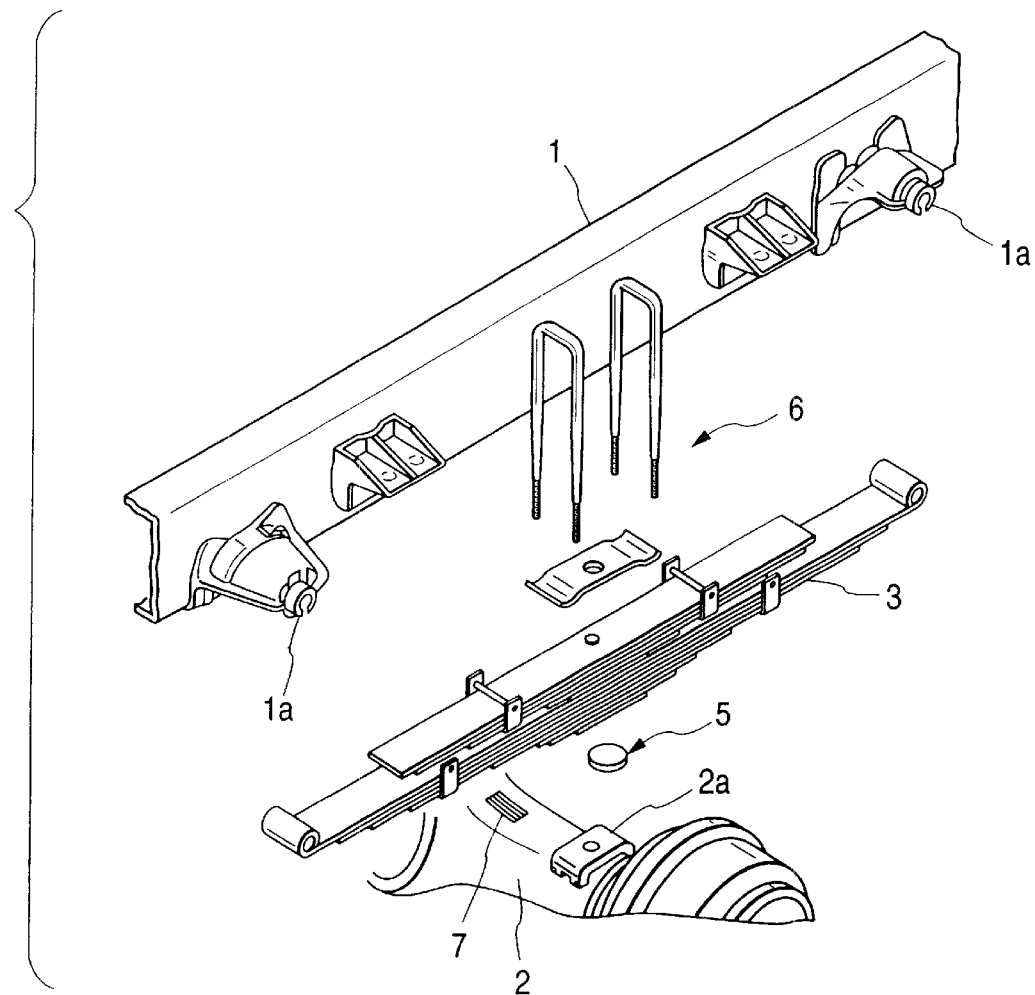
FIG. 1 is an exploded perspective view of an assembled portion for a vehicle according to the present invention including a load-carrying frame, an axle, a leaf spring etc.
Figure 2:
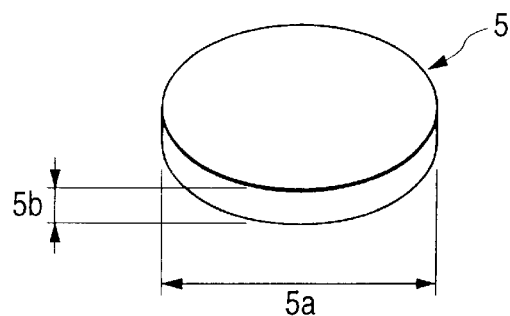
FIG. 2 is an enlarged diagram showing an eternal view of a load concentration unit of FIG. 1.
Figure 3:
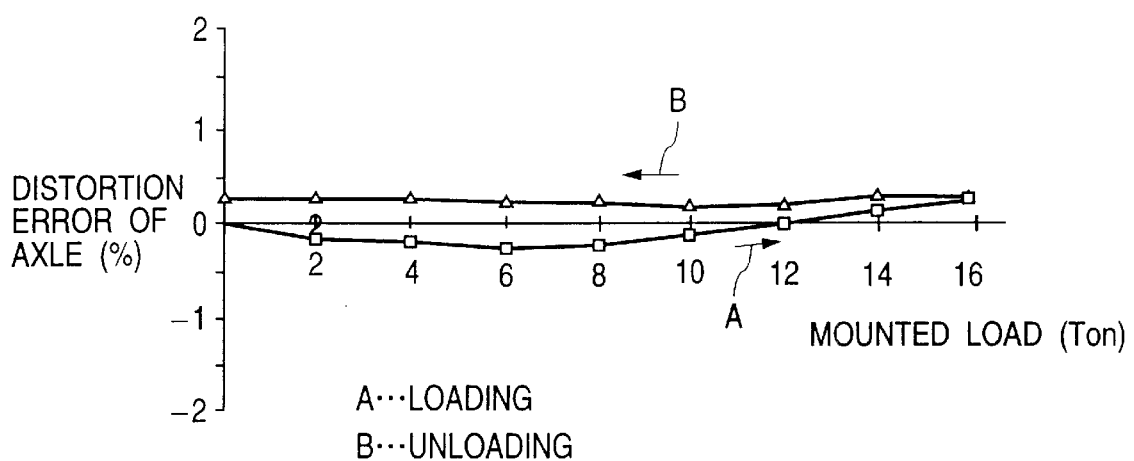
FIG. 3 is a diagram showing the relation according to the present invention between an amount of a load of a vehicle and a distortion error of the axle.

FIG. 1 is an exploded perspective view of an assembled portion for a vehicle according to the present invention including a load-carrying frame, an axle, a leaf spring etc. FIG. 2 is an enlarged diagram showing an eternal view of a load concentration unit of FIG. 1, and FIG. 3 is a diagram showing the relation according to the present invention between an amount of a load of a vehicle and a distortion error of the axle. In FIG. 3, an ordinate represents a distortion error (%) of the axle and an abscissa represents an amount (ton) of a load.

As shown in FIG. 1, the load measuring apparatus for vehicles is configured by a load-carrying frame 1, an axle 2, a spring (corresponding to a transmission member) 3 for a vehicle. Two supporting portions 1a are provided at the side wall of the load-carrying frame 1 so that the supporting portions 1a support the both ends of the leaf spring 3, respectively. The axle 2 includes an axle casing 2a for fixing the leaf spring 3 at the center portion thereof. The axle casing 2a is provided on the upper surface thereof with a load concentration unit 5 which concentrically receives a load transmitted from the leaf spring 3. A sensing element 7 corresponding to a distortion sensor is fixed on the upper surface of the axle 2 by adhesive, welding process etc. In the figure, there is not shown a lead wire drawn from the sensing element 7 nor a device for measuring a load.

As shown in FIG. 2, the load concentration unit 5 is formed in a circular plate shape with a diameter 5a and a thickness 5b separately from the axle 2. The diameter 5a is determined so as to deviate from the plastic deformation range of the load concentration unit 5 and minimize a contacting area to the axle casing (axle) 2a. The thickness 5b is determined in view of the influence to the plastic deformation range and the vehicle height by the load concentration unit 5 and also determined so that the leaf spring 3 does not directly contact to the axle 2 or the axle casing 2a when a load of the maximum loading capacity is mounted.

When the thickness 5b is determined in view of the vehicle height, the load concentration unit 5 can be employed in place of a conventional member for adjusting the vehicle height which is disposed between the axle 2 and the leaf spring 3.

In this manner, the leaf spring 3 supported by the load-carrying frame 1 at the supporting portions 1a is fixed at its center portion to the axle casing 2a in a state that the leaf spring 3 is made contact to the load concentration unit 5 by the attachment member 6. As a result, the load applied to the load-carrying frame 1 which is transmitted to the leaf spring 3 is concentrically applied to the load concentration unit 5. Thus, the load is applied to the axle 2 through the axle casing 2a to thereby generate distortion at the axle 2. An amount of the distortion is measured by the sensing element 7 and the load at every vehicle is measured based on the measured result of the sensing element.

Since the load transmitted from the leaf spring 3 is concentrically received by the load concentration unit 5, even if there occurs flexible distortion at the load-carrying frame 1 and the axle 2 in accordance with the change of a load applied to the load-carrying platform, the moving range of the center of the load transmitted from the leaf spring 3 to the axle casing 2a can be made small.

Accordingly, as shown in FIG. 3, even if an amount of a load mounted on the load-carrying platform changes due to the loading process A and the unloading process B, since the moving range of the center of the load transmitted from the leaf spring 3 to the axle casing 2a is made small, the hysteresis error where an amount of distortion of the axle 2 differs between the loading process A and the unloading process B can be suppressed equal to or less than ±0.5%.

Accordingly, since the hysteresis error can be reduced as compared with the conventional load measuring apparatus for vehicles, the measuring accuracy of a load measured based on the distortion amount of the axle 2 can be improved.

Further, since the axle (axle casing) 2 receives a load from the edge of the load concentration unit 5, the moving range of the center of the load transmitted to the axle 2 can be restricted within the contact surface of the load concentration unit 5 to the axle 2. For example, the moving range of the center of a load of a vehicle with a large moving range can be made small by employing the load concentration unit 5 having the contact surface area smaller than the moving range of the center of a load of this vehicle.

The smaller the contacting area between the load concentration unit 5 and the axle (axle casing) 2 is, the smaller the hysteresis error caused in accordance with the relation between amounts of a load mounted on the vehicle and amounts of the distortion of the axle becomes. However, when the load concentration unit 5 is made too small, the load concentration unit 5 is deformed by a load applied thereto. Thus, the load concentration unit 5 can be minimized by setting the contacting area between the load concentration unit 5 and the axle 2 so as to deviate from the plastic deformation range of the load concentration unit 5 and be small.

As a result, according to such characteristics that hysteresis error becomes smaller as the contacting area between the load concentration unit 5 and the axle (axle casing) 2 is made smaller, the moving range of the center of a load transmitted to the axle 2 can be made further smaller even if there occurs distortion of the load-carrying platform caused by the loading and unloading of load and the running state of the vehicle etc. and also even if there occurs the friction between the axle 2 and the leaf spring 3.

Further, since the load concentration unit 5 is made possible to be formed separately from the axle 2, the load concentration unit 5 can be formed by different material and in a different shape from the axle 2. For example, material with a small plastic deformation range can be used as the material of the load concentration unit 5. Also, the load concentration unit 5 can be realized by known members such as a vehicle-height adjusting member used for a different object. In this manner, since the load concentration unit 5 can be formed with the general-purpose properties, the load concentration unit 5 can be formed easily in accordance with various types of vehicles. Accordingly, the load measuring apparatus for vehicles capable of measuring a load with a high accuracy can be provided easily at every type of vehicle.

Although, in the aforesaid embodiment, the explanation is made as to a case where the load concentration unit 5 is formed in a circular plate shape, the present invention is not limited thereto, and the load concentration unit 5 can be formed in various different shapes. Hereinafter, an example of the load concentration unit 5 according to another embodiment will be explained.

Figure 4:
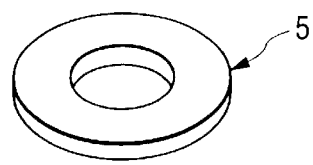
FIG. 4 is a diagram showing the load concentration unit formed in a doughnut shape.

FIG. 4 is a diagram showing the load concentration unit 5 formed in a doughnut shape. Such a load concentration unit is suitable, for example, when fitting a projection portion provided on the surface of the transmission member into and fixing to the hole of the doughnut-shaped load concentration unit 5, or when a fixing member such as a bolt is inserted into the load concentration unit 5 to thereby fix the leaf spring 3 (transmission member) to the axle 2. In this manner, even when the load concentration unit 5 is formed in such a configuration as a doughnut or rectangular frame shape, a load transmitted from the leaf spring 3 is concentrically received by the load concentration unit 5. Thus, even when a load applied to the load-carrying frame changes, the moving range of the center of the load transmitted to the axle 2 from the leaf spring 3 can be made small.

The investigation result will be explained with reference to FIGS. 5 to 10 as to the attachment position of the load concentration unit 5 on the axle 2 of a truck at which the hysteresis amount measured by the load concentration unit 5 becomes minimum.

First, the explanation will be made as to the optimum arrangement of the load concentration unit 5 with respect to hysteresis amounts in the traveling direction of a vehicle.

Figure 5:
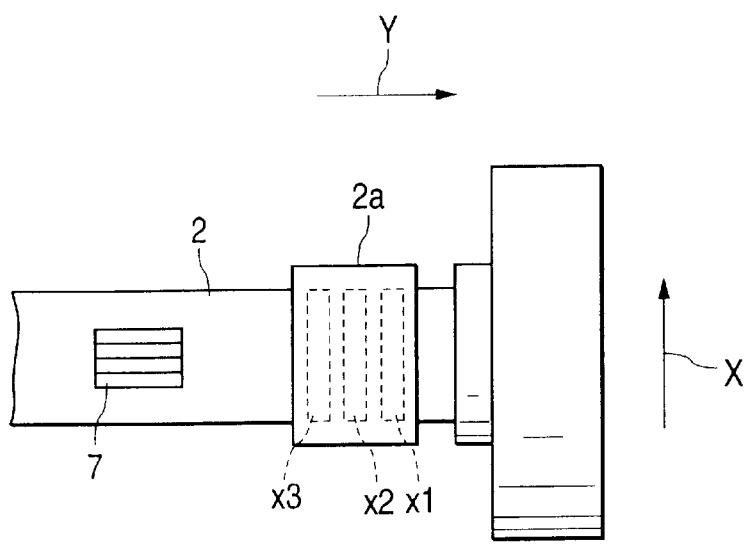
FIG. 5 is a diagram showing the arrangement used for measuring hysteresis amounts in the traveling direction.
Figure 6:
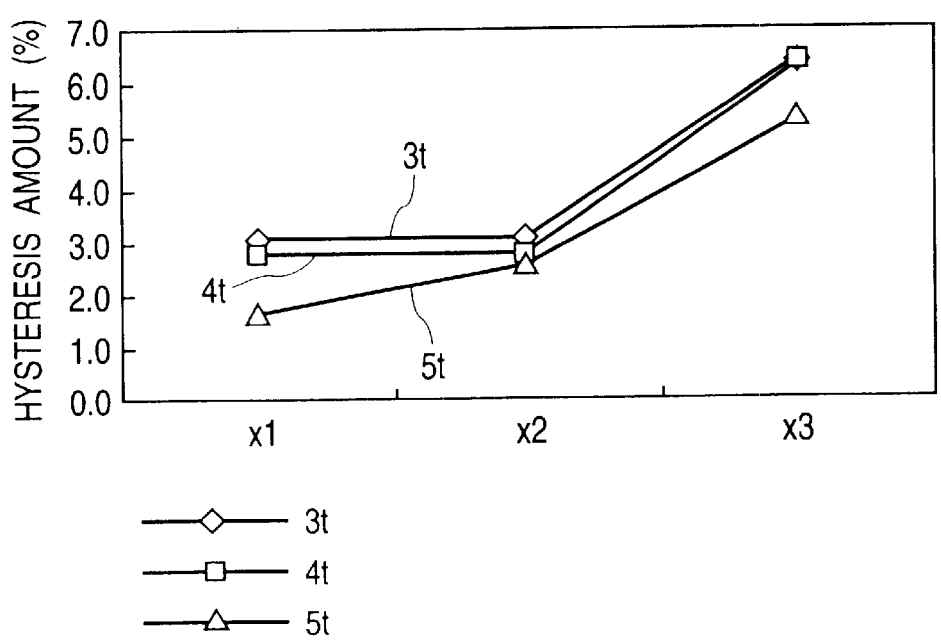
FIG. 6 is a diagram showing the relation between the positions of the load concentration unit shown in FIG. 5 and hysteresis amounts.
Figure 7:
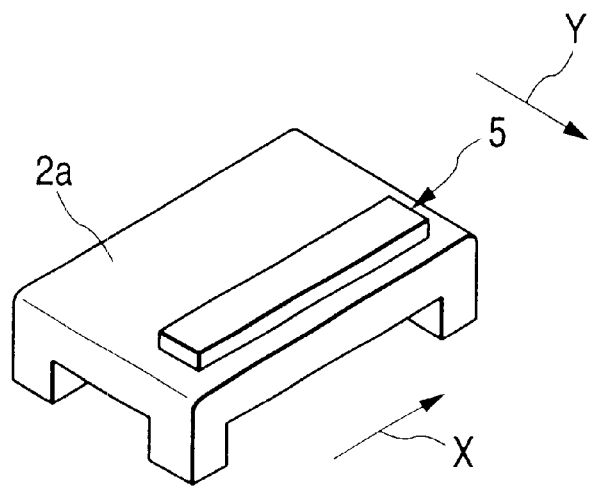
FIG. 7 is a diagram showing the optimum arrangement of the load concentration unit with respect to the traveling direction.

FIG. 5 is a diagram showing the arrangement used for measuring hysteresis amounts in the traveling direction, FIG. 6 is a diagram showing the relation between the positions of the load concentration unit 5 shown in FIG. 5 and hysteresis amounts, and FIG. 7 is a diagram showing the optimum arrangement of the load concentration unit 5 with respect to the traveling direction. In this case, the hysteresis amount [%] at each load is defined as a value which is obtained by dividing a difference (hysteresis) between a measured distortion amount upon loading and a measured distortion amount upon unloading at that load by the measure distortion difference at the time of mounting a load of the maximum loading capacity.

As shown in FIG. 5, in order to investigate hysteresis amounts in the traveling direction X, the load concentration unit 5 formed in a ribbon-like shape was sequentially positioned on the axle casing $2a$ of the axle 2 at an axial outer side x1, an axial center position x2 and an axial inner side x3 along the axial direction Y from the tire side. Then, at the each position of the load concentration unit 5, an amount of a load to be mounted was sequentially changed from 3 [ton], 4 [ton] and to 5 [ton] to thereby measure the distortion amount at each amount of the load by the sensing element 7. In this case, the axial outer side x1 is a position at the outside with respect to the axial center position x2 by 20 [mm] and the axial inner side x3 is a position at the inside with respect to the axial center position x2 by 20 [mm].

As the result of the investigation, as shown by a graph $3t$ of FIG. 6, when the load concentration unit 5 was positioned at the axial outer side x1, the hysteresis amounts were 3.13 [%], 2.84 [%] and 1.69 [%] at the load values of 3 [ton], 4 [ton] and 5 [ton], respectively. Further, as shown by a graph $4t$ of FIG. 6, when the load concentration unit 5 was positioned at the axial center position x2, the hysteresis amounts were 3.19 [%], 2.85 [%] and 2.65 [%] at the load values of 3 [ton], 4 [ton] and 5 [ton], respectively. Furthermore, as shown by a graph $5t$ of FIG. 6, when the load concentration unit 5 was positioned at the axial inner side x3, the hysteresis amounts were 6.46 [%], 6.37 [%] and 5.38 [%] at the load values of 3 [ton], 4 [ton] and 5 [ton], respectively.

As clear from the aforesaid measuring result, when detecting the distortion amounts of the axle 2 by the sensing element 7 provided at the axle 2, the hysteresis amounts can be reduced by positioning the load concentration unit 5 at the axial outer side x1 near the tire as shown in FIG. 7 when taking the hysteresis amounts in the traveling direction X into consideration. In other words, the hysteresis amounts can be made small by setting the distance between the sensing element 7 and the load concentration unit 5 to a large value.

Accordingly, the aforesaid arrangement is suitable, for example, in the case where the center position of the load transmitted to the axle 2 from the transmission member moves in the direction crossing with the axial direction Y of the axle 2 in accordance with the change of the amount of a load mounted on the load-carrying platform caused by the loading and unloading of the load. In this manner, even when the load concentration unit 5 is formed in a ribbon-like shape on the axle casing $2a$ so as to intersect the axial direction Y, a load transmitted from the transmission member is concentrically received by the load concentration unit 5 of a ribbon-like shape, like the aforesaid embodiment. Thus, even when a load applied to the vehicle changes, the moving range of the center of the load transmitted to the axle 2 from the transmission member through the axle casing $2a$ can be made small.

The explanation will be made as to the optimum arrangement of the load concentration unit 5 with respect to hysteresis amounts in the axial direction of the axle 2.

Figure 8:
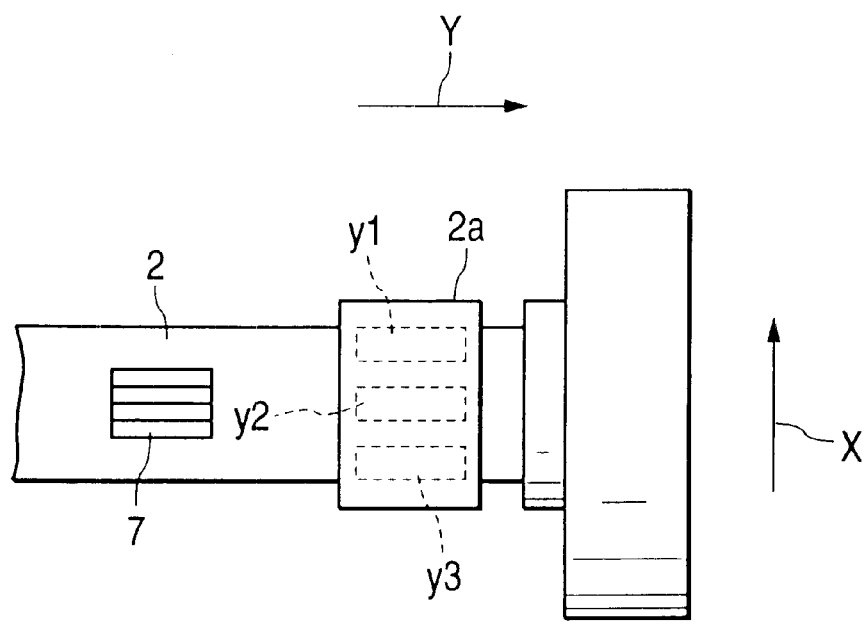
FIG. 8 is a diagram showing the arrangement used for measuring hysteresis amounts in the axial direction.
Figure 9:
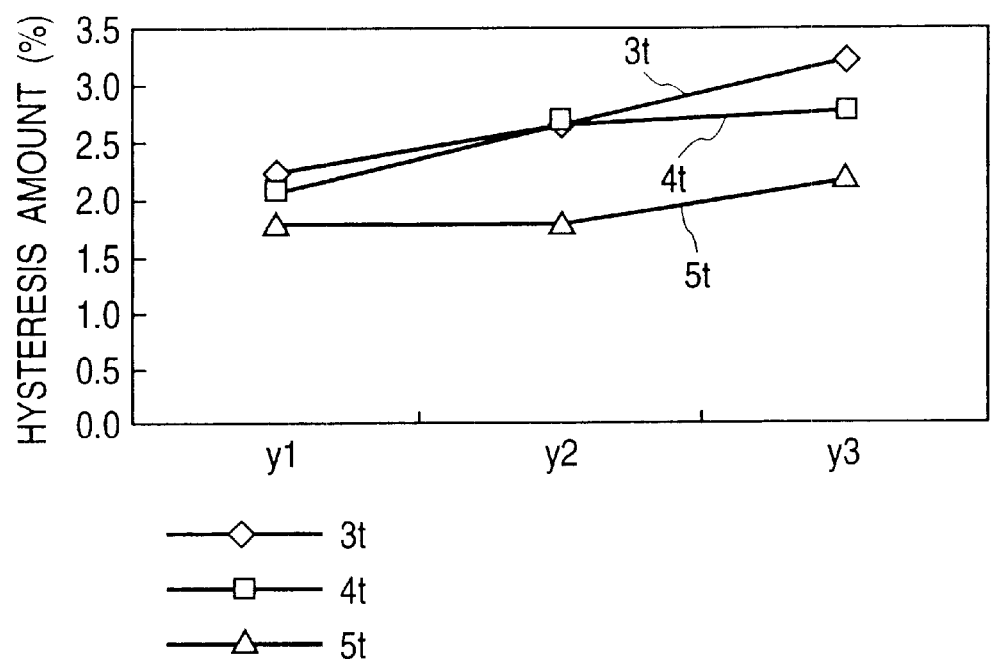
FIG. 9 is a diagram showing the relation between the positions of the load concentration unit shown in FIG. 8 and hysteresis amounts.
Figure 10:
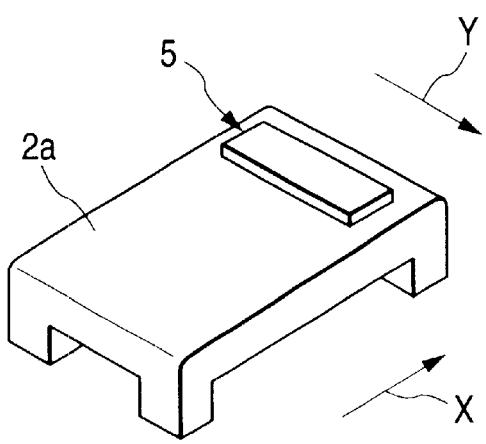
FIG. 10 is a diagram showing the optimum arrangement of the load concentration unit with respect to the axial direction.
Figure 11:
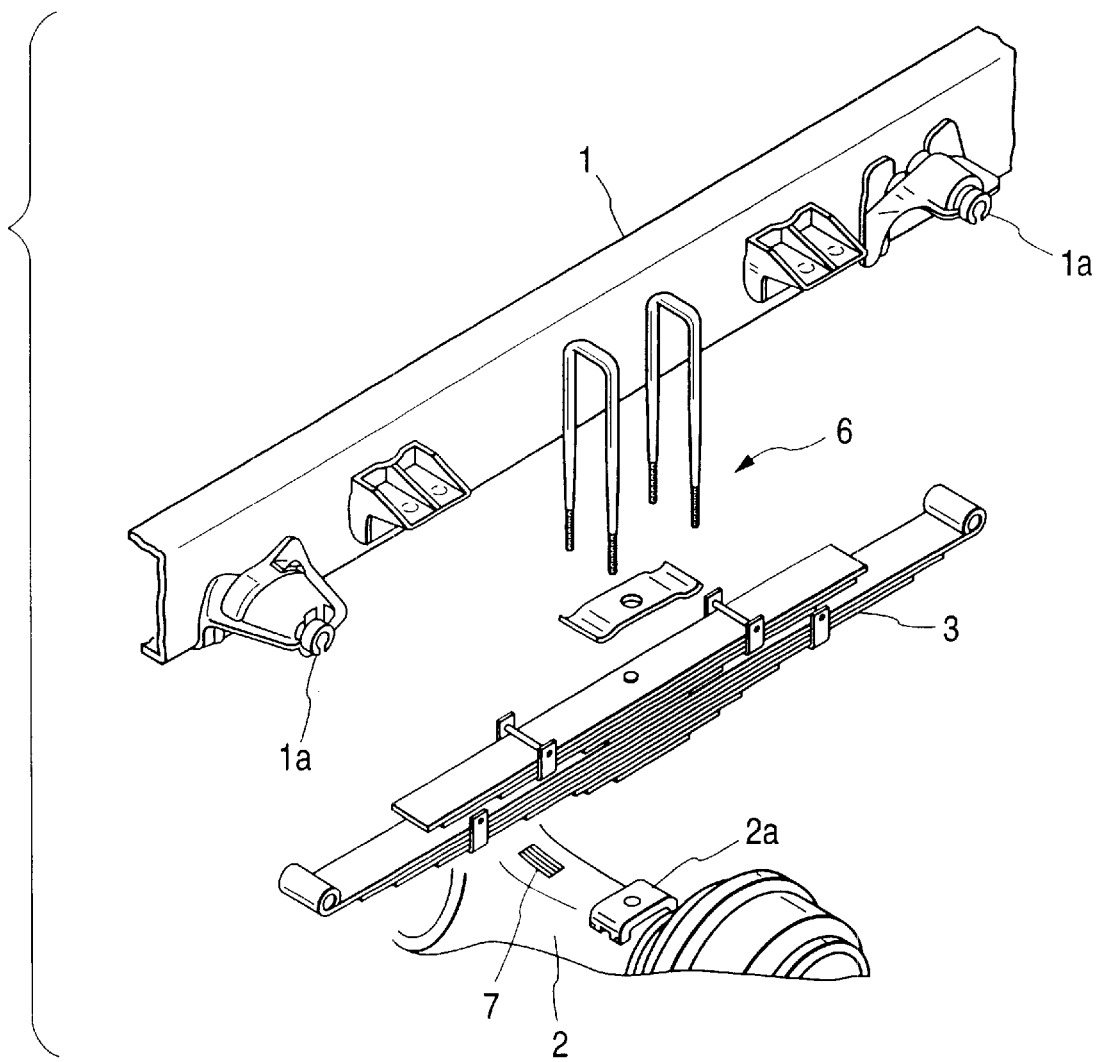
FIG. 11 is an exploded perspective view of a conventional assembled portion for a vehicle including a load-carrying frame, an axle, a leaf spring etc.
Figure 12A:
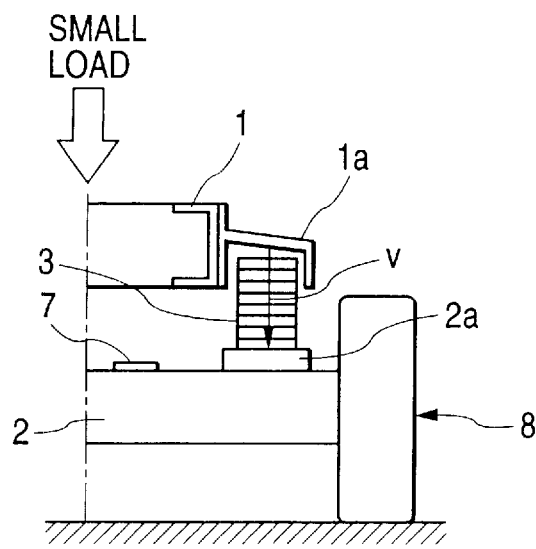
FIG. 12A is a diagram for explaining the conventional center of a load in the case of a small load.
Figure 12B:
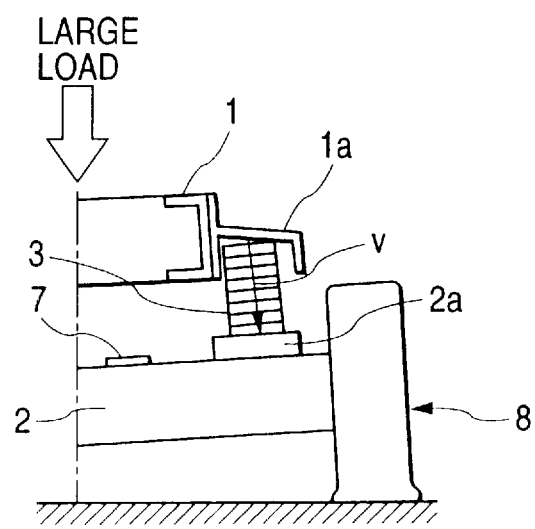
FIG. 12B is a diagram for explaining the center of a load in the case of a large load in the conventional apparatus.
Figure 13:
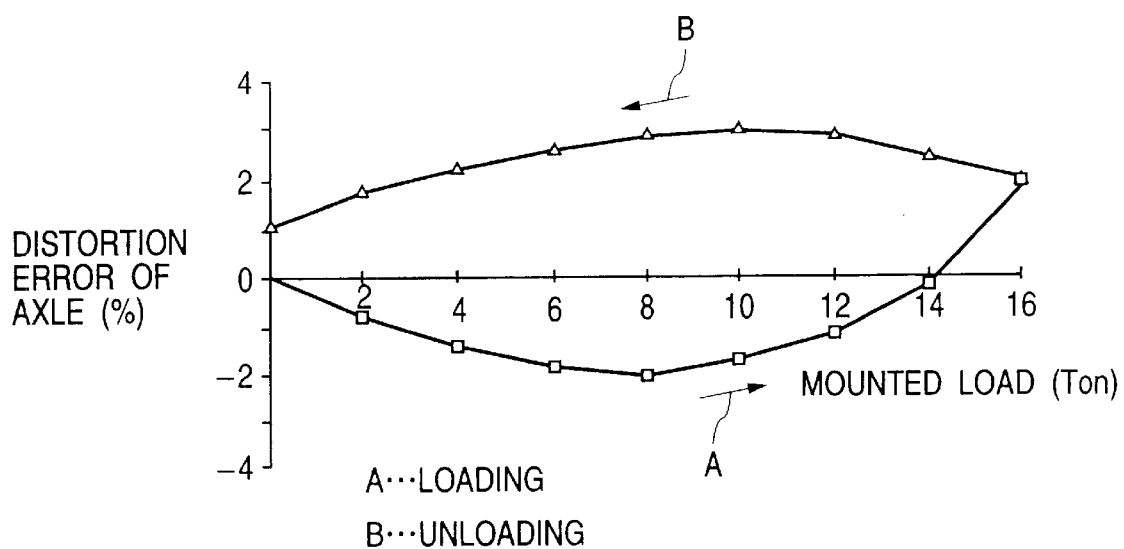
FIG. 13 is a diagram showing the relation according to the conventional apparatus between an amount of a load of a vehicle and a distortion error of the axle.

FIG. 8 is a diagram showing the arrangement used for measuring hysteresis amounts in the axial direction, FIG. 9 is a diagram showing the relation between the positions of the load concentration unit shown in FIG. 8 and hysteresis amounts, and FIG. 10 is a diagram showing the optimum arrangement of the load concentration unit with respect to the axial direction.

As shown in FIG. 8, in order to investigate hysteresis amounts in the axial direction Y, the load concentration unit 5 formed in a ribbon-like shape was sequentially positioned on the axle casing 2a of the axle 2 at a traveling direction front side y1, a traveling direction center position y2 and a traveling direction rear side y3 along the traveling direction X from the front side. Then, at the each position of the load concentration unit 5, an amount of a load to be mounted was sequentially changed from 3 [ton], 4 [ton] and to 5 [ton] to thereby measure the distortion amount at each amount of the load by the sensing element 7. In this case, the traveling direction front side y1 is a position at the front side with respect to the traveling direction center position y2 by 20 [mm] and the traveling direction rear side y3 is a position at the rear side with respect to the traveling direction center position y2 by 20 [mm].

As the result of the investigation, as shown by a graph 3t of FIG. 9, when the load concentration unit 5 was positioned at the traveling direction front side y1, the hysteresis amounts were 2.19 [%], 2.04 [%] and 1.78 [%] at the load values of 3 [ton], 4 [ton] and 5 [ton], respectively. Further, as shown by a graph 4t of FIG. 9, when the load concentration unit 5 was positioned at the traveling direction center position y2, the hysteresis amounts were 2.59 [%], 2.64 [%] and 1.76 [%] at the load values of 3 [ton], 4 [ton] and 5 [ton], respectively. Furthermore, as shown by a graph 5t of FIG. 9, when the load concentration unit 5 was positioned at the traveling direction rear side y3, the hysteresis amounts were 3.18 [%], 2.70 [%] and 2.13 [%] at the load values of 3 [ton], 4 [ton] and 5 [ton], respectively.

As clear from the aforesaid measuring result, when detecting the distortion amounts of the axle 2 by the sensing element 7 provided at the axle 2, as shown in FIG. 10, although the hysteresis amounts in the axial direction Y of the axle 2 can be made small at each of the traveling direction front side y1, the traveling direction center position y2 and the traveling direction rear side y3, the hysteresis amounts can be made minimum when the load concentration unit 5 is positioned at the traveling direction front side y1.

Thus, the aforesaid arrangement is suitable, for example, in the case where the center position of the load transmitted to the axle 2 from the transmission member moves in the axial direction Y of the axle 2 in accordance with the change of the amount of a load mounted on the load-carrying platform caused by the loading and unloading of the load. In this manner, even when the load concentration unit 5 is formed in a ribbon-like shape on the axle casing 2a and disposed so that the longitudinal direction thereof is in parallel to the axial direction Y, a load transmitted from the transmission member is concentrically applied to the load concentration unit 5 of an axially extended ribbon-like shape, like the aforesaid embodiment. Thus, even when a load applied to the vehicle changes, the moving range of the center of the load transmitted to the axle 2 from the transmission member through the axle casing 2a can be made small.

As described above, even when the load concentration unit 5 is formed in such a configuration as a doughnut or ribbon shape, the hysteresis amounts caused in accordance with the relation between amounts of a load mounted on a vehicle and amounts of the distortion of the axle 2 can be reduced, so that the measurement accuracy of loads measured based on the distortion amounts of the axle 2 can be improved.

In this manner, in order to reduce the hysteresis amount detected by the sensing element 7 of the axle 2, for example, the optimum position of the load concentration unit 5 is investigated through experimentation or simulation and the load concentration unit 5 is provided at the position determined in accordance with the result of the experimentation or simulation. Thus, since twisting phenomenon etc. is prevented from occurring at the axle 2, the sensing element 7 can accurately measure a distortion amount according to a load transmitted to the axle 2 through the load concentration unit 5. Accordingly, when the load concentration unit 5 is provided at the optimum position according to the kind and type of the vehicle, the load measuring apparatus for vehicles capable of measuring a load with a high accuracy can be provided easily.

Although, in the aforesaid embodiment, the explanation has been made as to the case where the load concentration unit 5 is provided separately from the axle 2, the present invention is not limited thereto, and the load concentration unit 5 may be provided integrally with the axle 2 of the axle casing 2a forming the axle 2.

Further, although, in the aforesaid embodiment, the explanation has been made as to the case where the load measuring apparatus for vehicles is used in a vehicle such as a truck having a load-carrying platform, the present invention is not limited thereto. For example, various different embodiments may be employed in which the leaf spring 3 corresponding to the transmission member may be replaced by an air suspension and the load measuring apparatus for vehicles employing the air suspension is applied to passenger vehicles or cars.

As described above, according to the load measuring apparatus for vehicles of the present invention, since the load transmitted to the axle through the transmission member is concentrically received by the load concentration unit, even if there occurs the distortion of the load-carrying frame and the friction etc. between the axle and the transmission member caused by the loading and unloading of goods and the running state etc. of the vehicle, the moving range of the center of the load transmitted to the axle can be made small. Accordingly, the hysteresis error caused in accordance with the relation between amounts of a load mounted on the vehicle and amounts of the distortion of the axle can be reduced, so that the present invention is advantageous in that the measurement accuracy of loads measured based on the distortion amounts of the axle can be improved.

Further, according to the load measuring apparatus for vehicles of the present invention, since the axle receives a load from the edge of the load concentration unit, the moving range of the center of the load transmitted to the axle can be restricted within the contact surface of the load concentration unit to the axle. For example, the moving range of the center of a load of a vehicle with a large moving range can be made small by employing the load concentration unit having the contact surface area smaller than the moving range of the center of a load of this vehicle. Accordingly, the present invention is advantageous in that the hysteresis error caused in accordance with the relation between amounts of a load mounted on the vehicle and amounts of the distortion of the axle can be reduced, so that the measurement accuracy of loads measured based on the distortion amounts of the axle can be improved.

Further, according to the load measuring apparatus for vehicles of the present invention, the smaller the contacting area between the load concentration unit and the axle is, the smaller the hysteresis error caused in accordance with the relation between amounts of a load mounted on the vehicle and amounts of the distortion of the axle becomes. However, when the load concentration unit is made too small, the load concentration unit is deformed by a load applied thereto. Therefore, the load concentration unit can be minimized by setting the contacting area between the load concentration unit and the axle so as to deviate from the plastic deformation range of the load concentration unit and be small. Accordingly, since the load can be transmitted to the axle more concentrically by the load concentration unit, the present invention is advantageous in that the hysteresis error caused in accordance with the relation between amounts of a load mounted on the vehicle and amounts of the distortion of the axle can be reduced, so that the measurement accuracy of loads measured based on the distortion amounts of the axle can be improved.

Further, according to the load measuring apparatus for vehicles of the present invention, the load concentration unit having the shape accorded to the kind and type of the vehicle is provided between the transmission member and the axle to thereby prevent the transmission member from directly contacting to the axle even at the time of mounting a load of the maximum loading capacity of the vehicle, so that the accurate load can be transmitted to the axle through the load concentration unit. Accordingly, the present invention is advantageous in that when the load concentration unit is formed so as to accord to the kind and type of the vehicle having a different maximum loading capacity, the load measuring apparatus for vehicles capable of measuring a load with a high accuracy can be provided easily at every type of vehicle.

Further, according to the load measuring apparatus for vehicles of the present invention, since it is possible to form the load concentration unit separately from the axle, the load concentration unit can be formed by material different from that of the axle. For example, it is possible to employ material with a small plastic deformation range for the load concentration unit. Further, the load concentration unit may be realized by a known member such as a height adjusting member used for a different object. In this manner, since the load concentration unit can be formed with the general-purpose properties, the load concentration unit can be formed easily in accordance with various types of vehicles. Accordingly, the present invention is advantageous in that the load measuring apparatus for vehicles capable of measuring a load with a high accuracy can be provided easily at every type of vehicle.

Further, according to the load measuring apparatus for vehicles of the present invention, in order to reduce the hysteresis amount detected by the distortion sensor of the axle, for example, the optimum position of the load concentration unit is investigated through experimentation or simulation and the load concentration unit is provided at the position determined in accordance with the result of the experimentation or simulation. Thus, since twisting phenomenon etc. is prevented from occurring at the axle, the distortion sensor can accurately measure a distortion amount according to a load transmitted to the axle through the load concentration unit. Accordingly, the present invention is advantageous in that when the load concentration unit is provided at the optimum position accorded to the kind and type of the vehicle, the load measuring apparatus for vehicles capable of measuring a load with a high accuracy can be provided easily.

What is claimed is:

1. A vehicle load measuring apparatus, which measures an amount of distortion of an axle caused by a load that is applied on a vehicle and transmitted to the axle through a transmission member, and which measures a value of the load based on the measured amount of the distortion, the load measuring apparatus comprising:

a load concentration unit, which is disposed between the transmission member and the axle, and receives the load concentrically; and a load measuring device disposed on the axle.

2. A vehicle load measuring apparatus according to claim 1, wherein a contact surface of the load concentration unit, which contacts with the axle, has a shape that restricts movement of the load transmitted to the axle.

3. A vehicle load measuring apparatus according to claim 1, wherein an area of a contact surface of the load concentration unit, which contacts with the axle, is set to a value to deviate from plastic deformation range of the load concentration unit and to be minimized.

4. A vehicle load measuring apparatus according to claim 2, wherein an area of the contact surface of the load concentration unit, which contacts with the axle, is set to a value to deviate from plastic deformation range of the load concentration unit and to be minimized.

5. A vehicle load measuring apparatus according to claim 1, wherein the load concentration unit has a shape that prevents the transmission member from directly contacting with the axle at a time of mounting a load of maximum loading capacity of the vehicle.

6. A vehicle load measuring apparatus according to claim 2, wherein the load concentration unit has a shape that prevents the transmission member from directly contacting with the axle at a time of mounting a load of maximum loading capacity of the vehicle.

7. A vehicle load measuring apparatus according to claim 3, wherein the load concentration unit has a shape that prevents the transmission member from directly contacting with the axle at a time of mounting a load of maximum loading capacity of the vehicle.

8. A vehicle load measuring apparatus according to claim 4, wherein the load concentration unit has a shape that prevents the transmission member from directly contacting with the axle at a time of mounting a load of maximum loading capacity of the vehicle.

9. A vehicle load measuring apparatus according to claim 1, wherein the load concentration unit is formed separately from the axle.

10. A vehicle load measuring apparatus according to claim 5, wherein the load concentration unit is formed separately from the axle.

11. A vehicle load measuring apparatus according to claim 1, wherein the load measuring device is a distortion sensor disposed on the axle, wherein the load concentration unit is provided at a position where hysteresis error of an amount of distortion of the axle detected by the distortion sensor is reduced.

12. A vehicle load measuring apparatus according to claim 2, wherein the load measuring device is a distortion sensor disposed on the axle, wherein the load concentration unit is provided at a position where hysteresis error of an amount of distortion of the axle detected by the distortion sensor is reduced.

13. A vehicle load measuring apparatus according to claim 3, wherein the load measuring device is a distortion sensor disposed on the axle, wherein the load concentration unit is provided at a position where hysteresis error of an amount of distortion of the axle detected by the distortion sensor is reduced.

14. A vehicle load measuring apparatus according to claim 4, wherein the load measuring device is a distortion sensor disposed on the axle, wherein the load concentration unit is provided at a position where hysteresis error of an amount of distortion of the axle detected by the distortion sensor is reduced.

15. A vehicle load measuring apparatus according to claim 5, wherein the load measuring device is a distortion sensor disposed on the axle, wherein the load concentration unit is provided at a position where hysteresis error of an amount of distortion of the axle detected by the distortion sensor is reduced.

16. A vehicle load measuring apparatus according to claim 6, wherein the load measuring device is a distortion sensor disposed on the axle, wherein the load concentration unit is provided at a position where hysteresis error of an amount of distortion of the axle detected by the distortion sensor is reduced.

17. A vehicle load measuring apparatus according to claim 7, wherein the load measuring device is a distortion sensor disposed on the axle, wherein the load concentration unit is provided at a position where hysteresis error of an amount of distortion of the axle detected by the distortion sensor is reduced.

18. A vehicle load measuring apparatus according to claim 8, wherein the load measuring device is a distortion sensor disposed on the axle, wherein the load concentration unit is provided at a position where hysteresis error of an amount of distortion of the axle detected by the distortion sensor is reduced.

19. A vehicle load measuring apparatus according to claim 9, wherein the load measuring device is a distortion sensor disposed on the axle, wherein the load concentration unit is provided at a position where hysteresis error of an amount of distortion of the axle detected by the distortion sensor is reduced.

20. A vehicle load measuring apparatus according to claim 10, wherein the load measuring device is a distortion sensor disposed on the axle, wherein the load concentration unit is provided at a position where hysteresis error of an amount of distortion of the axle detected by the distortion sensor is reduced.

* * * * *